United States Patent [19]

Berke et al.

[11] 4,379,309
[45] Apr. 5, 1983

[54] COMPOSITE VIDEO SIGNAL SEPARATOR

[75] Inventors: Herbert Berke, Maitland; Joseph Portoghese, Altamonte Springs, both of Fla.

[73] Assignee: The United States of America as represented by the Secretary of the Navy, Washington, D.C.

[21] Appl. No.: 256,355

[22] Filed: Apr. 22, 1981

[51] Int. Cl.³ .............................................. H04N 5/08
[52] U.S. Cl. ................................... 358/154; 358/153
[58] Field of Search ............... 358/148, 153, 154, 158; 375/106

[56] References Cited

U.S. PATENT DOCUMENTS

| | | | |
|---|---|---|---|
| 3,532,811 | 10/1970 | Dann | 358/154 |
| 3,736,378 | 5/1973 | Haferl | 358/154 |
| 3,743,774 | 7/1973 | Chipman | 358/154 |
| 3,845,240 | 10/1974 | Alaily | 358/153 |
| 4,254,435 | 3/1981 | Dayton | 358/153 |
| 4,333,107 | 6/1982 | McGuire | 358/153 |

Primary Examiner—Michael A. Masinick
Attorney, Agent, or Firm—Robert F. Beers; Robert W. Adams; David S. Kalmbaugh

[57] ABSTRACT

A composite video signal separator for television receivers, laser projection systems and the like which performs the combined functions of horizontal sync signal separation, vertical sync signal separation, and video signal separation in a single circuit.

11 Claims, 2 Drawing Figures

COMPOSITE VIDEO SIGNAL SEPARATOR

BACKGROUND OF THE INVENTION

1. Field of the Invention

The present invention relates generally to a signal processing stage useful in laser projection systems, television systems, and the like. In particular, this invention relates to an electronics circuit which separates the horizontal sync signal, the vertical sync signal and the video information signal from an incoming composite video signal.

2. Description of the Prior Art

Heretofore, numerous electronic circuits have been employed for separating horizontal and vertical sync signals from an incoming composite video signal. Such systems are too numerous to discuss herewith. Besides, most thereof constitute prior art devices which are well known to the artisan, thereby obviating the need for further discussion thereof.

Of course, there are several prior art devices which are of some significance, inasmuch as they at least remotely or indirectly concern subject matter that is pertinent to the system constituting the instant composite video signal separator.

For example, U.S. Pat. No. 3,532,811 to Bert H. Dann discloses a circuit for separating sync signals from a composite video signal, the operation of which is based on the fact that the time the video signal is at sync tip level during one field is fixed in relation to the total time of one field in a standardized television broadcast signal. A capacitor is arranged to be charged from a first current source and discharged by a second current source, the current sources having essentially constant current and the currents being in the same ratio as the ratio of the time the video signal is not at sync tip level to the time the voltage is at sync tip level. The voltage across the capacitor controls the turning on and turning off of an output transistor in synchronism with the sync tips of the composite video input signal.

U.S. Pat. No. 3,743,774 to Jack R. Chipman and Joseph E. Morrow discloses a synchronizing signal separational circuit which has an improved active low pass filter for passing only vertical synchronizing signals, a passive high pass filter for passing horizontal synchronizing signals, and an amplifier which supplies both vertical and horizontal synchronizing signals to the filters after clipping and limiting a detected video signal to eliminate video information signals and noise, respectively.

U.S. Pat. No. 3,736,378 to Peter E. Haferl discloses a video signal processing stage for a television receiver which performs the combined functions of video demodulation, automatic gain control voltage generation, horizontal synchronizing pulse separation, and vertical synchronizing pulse separation in a signal circuit.

While satisfactory for their intended purposes, that of horizontal and vertical sync signal separation, the first two mentioned devices of the prior art fail to separate video information from an incoming composite video signal. With respect to the last mentioned device of the prior art, it is complex in design, does not perform exactly the same functions as the subject invention, and contains a combination of elements that is somewhat different from that of the present invention.

SUMMARY OF THE INVENTION

The subject invention overcomes some of the difficulties of the prior art, including those mentioned above, in that it comprises a relatively simple composite video signal separator adapted for separating an incoming composite video signal into a horizontal sync signal, a vertical sync signal, and video information signal.

Included in the subject invention are an input terminal adapted to receive a composite video signal which has therein horizontal and vertical sync components and a video component, first separator means adapted to pass the video component of the composite video signal, and second separator means adapted to pass the horizontal and vertical sync components of the composite video signal. A first phase lock loop circuit locks in upon the vertical sync component of the composite video signal so as to provide at the output thereof a vertical sync signal, while a second phase lock loop circuit locks in upon the horizontal sync component of the composite video signal so as to provide at the output thereof a horizontal sync signal. The vertical sync signal is then supplied to a first one-shot multivibrator which expands the pulse width of each sync pulse of the vertical sync signal. Likewise, the horizontal sync signal is supplied to a second one-shot multivibrator which expands the pulse width of each sync pulse of the horizontal sync signal. The aforementioned horizontal and vertical sync signals, and the video signal may then be supplied to any television system or the like for utilization thereby.

BRIEF DESCRIPTION OF THE DRAWINGS

FIG. 2 is a graphical representation of various pulses which occur at the outputs of some of the elements of FIG. 1.

DESCRIPTION OF THE PREFERRED EMBODIMENT

Figure 1:
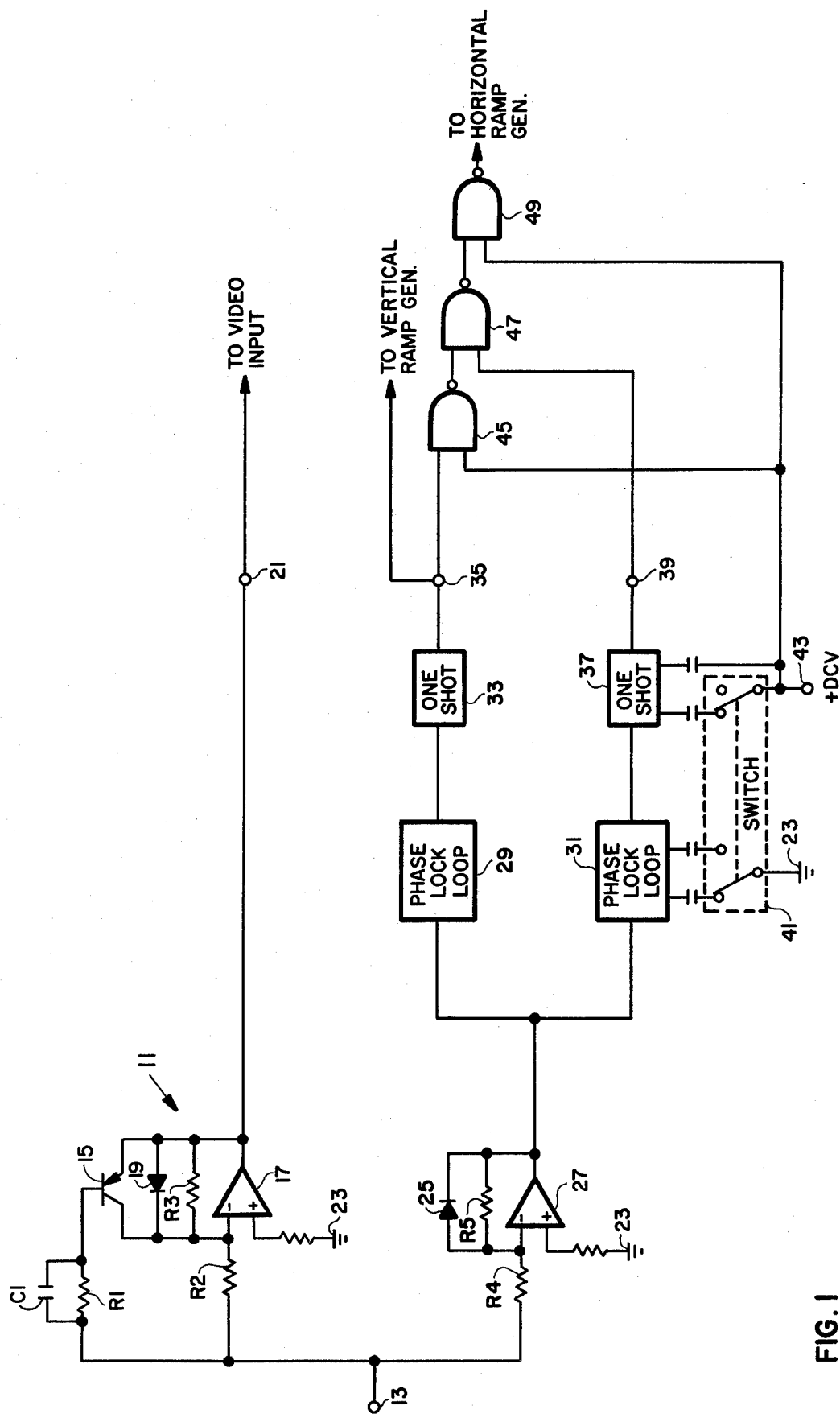
FIG. 1 is a combination block and schematic diagram of the composite video signal separator constituting the subject invention.

The preferred embodiment of the subject invention will now be discussed in some detail in conjunction with all of the figures of the drawing, wherein like parts are designated by like reference numerals insofar as it is possible and practical to do so.

Referring now to FIG. 1, there is shown a composite video signal separator 11 which includes an input terminal 13, connected through the parallel combination of a resistor R1 and a capacitor C1 to the base of a PNP transistor 15. Input terminal 13 is also connected through a resistor R2 to the negative input of an operational amplifier 17, the cathode of a diode 19, and the collector of PNP transistor 15. The output of operational amplifier 17, in turn, is connected to an output terminal 21, and the anode of diode 19, while the positive input of operational amplifier 17 is effectively connected to a ground 23. Connected between the negative input of operational amplifier 17 and the output thereof is a resistor R3.

In addition, input terminal 13 is connected through a resistor R4 to the anode of a diode 25, and the negative input of an operational amplifier 27. The output of operational amplifier 27 is, in turn, connected to the cathode of diode 25, the data input of a phase lock loop circuit 29, and the data input of a phase lock loop circuit 31. The positive input of operational amplifier 27 is effectively connected to ground 23 while a resistor R5 is connected between the negative input and the output of operational amplifier 27.

The output of phase lock loop circuit 29 is connected to the data input of a one-shot multivibrator 33, the output of which is connected to an output terminal 35. Similarly, the output of phase lock loop circuit 31 is connected to the data input of a one-shot multivibrator 37, the output of which is connected to an output terminal 39.

Ground 23 is connected to the first input of a double pole double throw switch 41, while the second input thereof is connected to the output of a direct current voltage source 43. The first and second outputs of double pole double throw switch 41 are respectively connected to the first and second control inputs of phase lock loop circuit 31, while the third output of double pole double throw switch 41 is connected to the first control input of one-shot multivibrator 37. In addition, the output of direct current voltage source 43 is connected to the second control input of one-shot multivibrator 37.

Connected to output terminal 35 is the first input of a NAND gate 45, the output of which is connected to the first input of a NAND gate 47, with the output thereof connected to the first input of a NAND gate 49. The output of direct current voltage source 43 is connected to the second inputs of NAND gates 45 and 49, while output terminal 39 is connected to the second input of NAND gate 47.

In the exemplary composite video signal separator of FIG. 1, according to the subject invention components and electrical values successfully utilized are as follows:

| Resistors: | | |
| --- | --- | --- |
| | R1 | 2K ohms |
| | R2 | 1K ohms |
| | R3 | 2K ohms |
| | R4 | 1K ohms |
| | R5 | 4K ohms |
| Capacitors: | | |
| | C1 | 5 pf |
| NAND Gates: | | |
| | 45 | 7400 |
| | 47 | |
| | 49 | |
| Diodes: | | |
| | 19 | 5082–2800 |
| | 25 | IN 914 |
| Operational Amplifiers: | | |
| | 17 | UA 741 |
| | 27 | UA 741 |
| Phase Lock Loops: | | |
| | 29 | NE 565 |
| | 31 | NE 565 |
| One-Shot Multivibrator: | | |
| | 33 | 9602 |
| | 37 | 9602 |

It should be noted at this time that diode 19 is a high speed switching diode which is commercially available from Hewlett Packerd, Inc. of Palo-Alto, Calif., and phase lock loop circuits 29 and 31 are electronic servo loops which are commercially available from Signetics, Inc. of Sunnyvale, Calif. In addition, it should be noted that operational amplifiers 17 and 27 are commercially available from Burr Brown, Inc. of Tucson, Ariz., and one-shot multivibrators 33 and 37 are commercially available from Fairchild, Inc. of Mountain View, Calif.

The operation of the subject invention will now be described in conjunction with all of the figures of the drawing.

Referring now to FIG. 1, a composite video signal, similar to that depicted in FIG. 2 (A), is applied to input terminal 13 of composite video signal separator 11. The composite video signal of FIG. 2 (A) includes therein a horizontal sync component having therein a plurality of horizontal sync pulses 51, the frequency of which is 15.605 kilohertz, a vertical sync component having therein a plurality of vertical sync pulses 53, the frequency of which is 60 hertz, and a video information component 55. The horizontal dashed line 57 of FIGS. 2A through 2H represents the line of zero voltage.

A positive voltage applied to input terminal 13 will back bias diode 19 such that diode 19 will function as an open circuit, thereby causing amplifier 17 to become operative, while a negative voltage applied to input terminal 13 will forward bias diode 19 such that diode 19 will function as a short circuit, thereby inactivating amplifier 17. Thus, whenever diode 19 is back biased by a positive voltage applied to input terminal 13, operational amplifier 17 will pass therethrough, amplify, and invert only the positive voltage component of any signal applied to input terminal 13. Accordingly, only video information component 55 of the composite video signal of FIG. 2(A) will pass through, and be amplified and inverted by amplifier 17 such that a video information signal similar to that depicted in FIG. 2(B) will appear at output terminal 21.

A negative pulse applied through the parallel combination of resistor R1 and capacitor C1 to the base of PNP transistor 15 will trigger transistor 15 such that transistor 15 will function as a short circuit thereby rendering operational amplifier 17 not operative. Thus, each horizontal sync pulse 51 and vertical sync pulse 53 of the composite video signal of FIG. 2(A) will inactivate operational amplifier 17 such that only the video information component 55 of the signal of FIG. 2(A) will pass through operational amplifier 17.

It should be noted at this time that diode 19 will function under normal operating conditions to prevent the passage of non-video information through operational amplifier 17 in the manner described above. However, due to the fast switching times involved in the operation of the subject invention, PNP transistor 15 was utilized in the manner described above to insure that non-video information does not pass through operational amplifier 17 to output terminal 21.

A negative voltage applied to input terminal 13 will back bias diode 25 such that diode 25 will function as an open circuit thereby causing amplifier 27 to become operative, while a positive voltage applied to input terminal 13 will forward bias diode 25 such that diode 25 will function as a short circuit thereby inactivating amplifier 27. Thus, whenever diode 25 is back biased by a negative voltage applied to input terminal 13, operational amplifier 27 will pass therethrough, and amplify and invert only the negative voltage component of any signal applied to input terminal 13. Accordingly, only the horizontal and vertical sync components of the signal of FIG. 2(A) will pass through, be amplified and inverted by amplifier 27 such that a signal similar to that depicted in FIG. 2(C) will appear at the output of operational amplifier 27.

The signal of FIG. 2(C) is supplied to the data inputs of phase lock loop circuits 29 and 31. Phase lock loop circuit 29, in turn, is preset to lock in upon or synchronize only with an incoming signal having a frequency of sixty hertz; and will provide at the output thereof a sync signal having a frequency of sixty hertz, the same as the frequency of the vertical sync component of the signal of FIG. 2(C). The aforementioned sync signal is then supplied to the input of one-shot multivibrator 33 which expands each pulse of the aforementioned sync signal to a pulse width of approximately 0.5 millisecond so as to provide at the output thereof a vertical sync signal similar to that of FIG. 2(D).

Phase lock loop circuit 31 is preset to lock in upon or synchronize only with an incoming signal having a frequency of 15.625 kilohertz when switch 41 is positioned such that ground 23 is effectively connected to the first control input of phase lock loop circuit 31. Phase lock loop circuit 31 will then provide at the output thereof a signal having a frequency of 15.625 kilohertz, the same as the frequency of the horizontal sync component of the signal of FIG. 2(C). The aforementioned sync signal is then supplied to the input of one-shot multivibrator 37 which expands each pulse of the aforementioned sync signal to a pulse width of approximately 6 microseconds whenever switch 41 is positioned such that direct current voltage source 43 supplies direct current to the first and second control inputs of one-shot multivibrator 37. This, in turn, results in one-shot multivibrator 37 providing at the output thereof a horizontal sync signal similar to that depicted in FIG. 2(E).

At this time, it may be noteworthy to mention that whenever switch 41 is positioned such that ground 23 is effectively connected to the second control input of phase lock loop circuit 31, circuit 31 will lock in upon an incoming signal having a frequency of 31.25 khz, and provide at the output thereof a sync signal having a frequency of 31.25 khz. One-shot multivibrator 37 will then expand each pulse of the aforementioned sync signal to a pulse width of approximately 3 microseconds since switch 41 is positioned such that direct current voltage source 43 will supply direct current to the first control input of one-shot multivibrator 37. Thus it may readily be seen by the artisan that the subject may be adapted to either a 525 or 1023 line television system since the vertical and horizontal sync signals provided respectively at output terminals 35 and 39 are compatible with either of the aforementioned television systems.

Although the subject invention may be adapted to a conventional television system, it was designed specifically for utilization with the Pilot Helmet Mounted Display System described in U.S. patent application, Ser. No. 104,521, by James F. Harvey, Walter S. Chambers and John J. Kulik. The horizontal sync signal of FIG. 2(E) must be modified in the following manner so as to be compatible with the projection apparatus in the aforementioned helmet mounted display system. The vertical sync signal of FIG. 2(D) is inverted by NAND gate 45 so as to supply to the first input of NAND gate 47 the signal of FIG. 2(F).

NAND gate 47 then combines the signal of FIG. 2(F) with the horizontal sync signal of FIG. 2(E) and inverts the resultant signal so as to provide at the output thereof a signal similar to that depicted in FIG. 2(G). The signal of 2(G) is supplied to the first input of NAND gate 49 which inverts the aforementioned signal so as to provide at the output thereof a horizontal sync signal similar to that depicted in FIG. 2(H).

The signals of FIGS. 2(B), 2(D), and 2(H) are then supplied to the video input, a vertical ramp generator, and a horizontal ramp generator of the projection apparatus of the aforementioned helmet mounted display system for utilization thereby so as to effect the operation of the helmet mounted display system in the manner described in U.S. patent application Ser. No. 104,521.

From the foregoing description, it may readily be seen that the subject invention comprises a new, unique, and exceedingly useful composite video signal separator which constitutes a considerable improvement over the known prior art. Obviously, many modifications and variations of the present invention are possible in light of the above teachings. It is, therefore, to be understood that within the scope of the appended claims the subject invention may be practiced otherwise than as specifically described.

What is claimed is:

1. A composite video signal separator comprising, in combination:
   an input terminal adapted for receiving a composite video signal, said composite video signal having therein a horizontal sync component, a vertical sync component, and a video component;
   first separating means having an input connected to said input terminal, and an output for passing therethrough the video component of said composite video signal, for amplifying the video component of said composite video signal, and for inverting the video component of said composite video signal so as to provide at the output thereof a video signal;
   second separating means having an input connected to said input terminal and an output for passing therethrough the horizontal sync and vertical sync components of said composite video signal, for amplifying the horizontal sync and vertical sync components of said composite video signal, and for inverting the horizontal sync and vertical sync components of said composite video signal;
   first phase lock loop circuit means having a data input connected to the output of said second separating means and an output for locking in upon the vertical sync component of said composite video signal so as to provide at the output thereof a vertical sync signal, said vertical sync signal having therein a plurality of vertical sync pulses;
   second phase lock loop circuit means having a data input connected to the output of said second separating means, first and second control inputs, and an output for locking in upon the horizontal sync component of said composite video signal so as to provide at the output thereof a horizontal sync signal, said horizontal sync signal having therein a plurality of horizontal sync pulses;
   first one-shot multivibrator means having a data input connected to the output of said first phase lock loop circuit means and an output for expanding the pulse width of each pulse of said vertical sync signal; and
   second one-shot multivibrator means having a data input connected to the output of said second phase lock loop circuit means, first and second control inputs, and an output for expanding the pulse width of each pulse of said horizontal sync signal.

2. The composite video signal separator of claim 1, wherein said first separating means comprises:

an operational amplifier having an input and an output, with the input thereof connected to said input terminal; and a diode having an anode and a cathode, with the anode thereof connected to the output of said operational amplifier and the cathode thereof connected to the input of said operational amplifier.

3. The composite video signal separator of claim 1 wherein said second separating means comprises:
an operational amplifier having an input and an output, with the input thereof connected to said input terminal; and a diode having an anode and a cathode, with the anode thereof connected to the input of said operational amplifier and with the cathode thereof connected to the output of said operational amplifier.

4. The composite video signal separator of claim 1 further characterized by:
a transistor having an emitter, a base, and a collector, with the emitter thereof connected to the output of said first separating means, the collector thereof connected to the input of said first separating means, and the base thereof effectively connected to said input terminal; and the parallel combination of a resistor and a capacitor connected between said input terminal and the base of said transistor.

5. The composite video signal separator of claim 4 wherein said transistor is a PNP transistor.

6. The composite video signal separator of claim 1 further characterized by:
a direct current voltage source having an output connected to the second control input of said one-shot multivibrator means;

a ground; and a double pole double throw switch having a first input connected to said ground, a second input connected to the output of said direct current voltage source, a first output connected to the first control input of said second phase lock loop circuit means, a second output connected to the second control input of said second phase lock loop circuit means, a third output connected to the first control input of said second one-shot multivibrator means.

7. The composite video signal separator of claim 6 further characterized by:
a first NAND gate having a first input connected to the output of said first one-shot multivibrator means, a second input connected to the output of said direct current voltage source and an output;

a second NAND gate having a first input connected to the output of said first NAND gate, a second input connected to the output of said second one-shot multivibrator means, and an output; and a third NAND gate having a first input connected to the output of said second NAND gate, and a second input connected to the output of said direct current voltage source.

8. A circuit for separating horizontal and vertical sync signals and a video signal from a composite video signal comprising, in combination:
an input terminal;

a transistor having an emitter, a base, and a collector, with the base thereof connected to said input terminal;

a first operational amplifier having an input and an output, with the input thereof effectively connected to said input terminal and the collector of said transistor, and with the output thereof connected to the emitter of said transistor;

a first diode having an anode and a cathode, with the anode thereof connected to the emitter of said transistor and with the cathode thereof connected to the collector of said transistor;

a second operational amplifier having an input and an output, with the input thereof effectively connected to said input terminal;

a second diode having an anode and a cathode, with the anode thereof connected to the input of said second operational amplifier and the cathode thereof connected to the output of said second operational amplifier.

a first phase lock loop circuit having a data input connected to the output of said second operational amplifier and an output;

a first one-shot multivibrator having a data input connected to the output of said first phase lock loop circuit and an output;

a second phase lock loop circuit having a data input, first and second control inputs, and an output, with the data input thereof connected to the output of said second operational amplifier;

a second one-shot multivibrator having a data input, first and second control inputs, and an output, with the data input thereof connected to the output of said second phase lock loop circuit;

a direct current voltage source having an output connected to the second control input of said second one-shot multivibrator;

a ground;

a double pole double throw switch having a first input connected to said ground, a second input connected to the output of said direct current voltage source, a first output connected to the first control input of said second phase lock loop circuit, a second output connected to the second control input of said second phase lock loop circuit, and a third output connected to the first control input of said second one-shot multivibrator; and first, second and third output terminals, the first of which is connected to the output of said first operational amplifier, the second of which is connected to the output of said first one-shot multivibrator, and the third of which is connected to the output of said second one-shot multivibrator.

9. The circuit of claim 9 wherein said transistor is a PNP transistor.

10. The circuit of claim 8 further characterized by the parallel combination of a resistor and a capacitor connected between said input terminal and the base of said transistor.

11. The circuit of claim 8 further characterized by:
a first NAND gate having a first input connected to said second output terminal, a second input connected to the output of said direct current voltage source, and an output;

a second NAND gate having a first input connected to the output of said first NAND gate, a second input connected to said third output terminal, and an output; and a third NAND gate having a first input connected to the output of said second NAND gate, and a second input connected to the output of said direct current voltage source.

* * * * *